United States Patent
Zises

(10) Patent No.: US 9,456,309 B2
(45) Date of Patent: Sep. 27, 2016

(54) SYSTEMS AND METHODS FOR WAIT TIME ESTIMATION

(71) Applicant: PAYPAL, INC., San Jose, CA (US)

(72) Inventor: Matthew Scott Zises, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 14/586,921

(22) Filed: Dec. 30, 2014

(65) Prior Publication Data

US 2016/0192149 A1  Jun. 30, 2016

(51) Int. Cl.
*H04W 4/02* (2009.01)
*H04W 4/00* (2009.01)

(52) U.S. Cl.
CPC ............ *H04W 4/027* (2013.01); *H04W 4/008* (2013.01); *H04W 4/028* (2013.01); *H04W 4/023* (2013.01)

(58) Field of Classification Search
CPC ... H04W 4/027; H04W 4/008; H04W 4/028; H04W 4/023
See application file for complete search history.

(56) References Cited

U.S. PATENT DOCUMENTS

| | | | |
|---|---|---|---|
| 2013/0117695 A1 | 5/2013 | Hammoud | |
| 2014/0104034 A1 | 4/2014 | Ambrefe et al. | |
| 2014/0163934 A1 | 6/2014 | Zhang et al. | |
| 2015/0038171 A1* | 2/2015 | Uilecan | G06Q 10/109 455/456.3 |
| 2015/0186957 A1* | 7/2015 | Barr | G06Q 30/0281 705/346 |
| 2015/0227969 A1* | 8/2015 | Hanly | G06Q 30/0252 705/14.5 |
| 2016/0005053 A1* | 1/2016 | Klima | G06Q 30/0201 705/7.29 |

* cited by examiner

*Primary Examiner* — Barry Taylor
(74) *Attorney, Agent, or Firm* — Haynes and Boone, LLP

(57) ABSTRACT

A system or method is provided to estimate wait time at a line or a queue. In particular, the system may estimate the wait time at a line by detecting the presence of a user at the line via Bluetooth Low Energy (BLE) communication. In an embodiment, the system may detect when the user enters the line and when the user departs from the line via BLE beacons and may estimate the wait time at the line based on how long the user is in line. In an embodiment, a grid of multiple BLE beacons may be installed or provided at the location of the line to track the location and movement of a user. The system may determine the wait time for the line based on the location and the movement of the user.

20 Claims, 6 Drawing Sheets

300

SYSTEMS AND METHODS FOR WAIT TIME ESTIMATION

BACKGROUND

1. Field of the Invention

The present invention generally relates to systems and methods for estimating wait time at lines or queues.

2. Related Art

Public venues such as airports, amusement parks, and the like, sometimes require customers to wait in line to receive services or for access to certain facilities. Operators of public venues may estimate and provide wait time information to customers, such that customers may know how long the wait time is for a line or a queue. Typically, operators of public venues may estimate the wait time for a line based on historical data, and more recently, crowd sourcing. However, the wait time for a line depends of a plurality of factors that may change frequently based on specific situations. Further, the conventional technique for estimating wait time may sometimes require customers' input, which may be cumbersome or inconvenient to the customers and/or inaccurate. As such, there is a need for a system or method that estimates the wait time of a line in real time and with accuracy.

Figure 1:
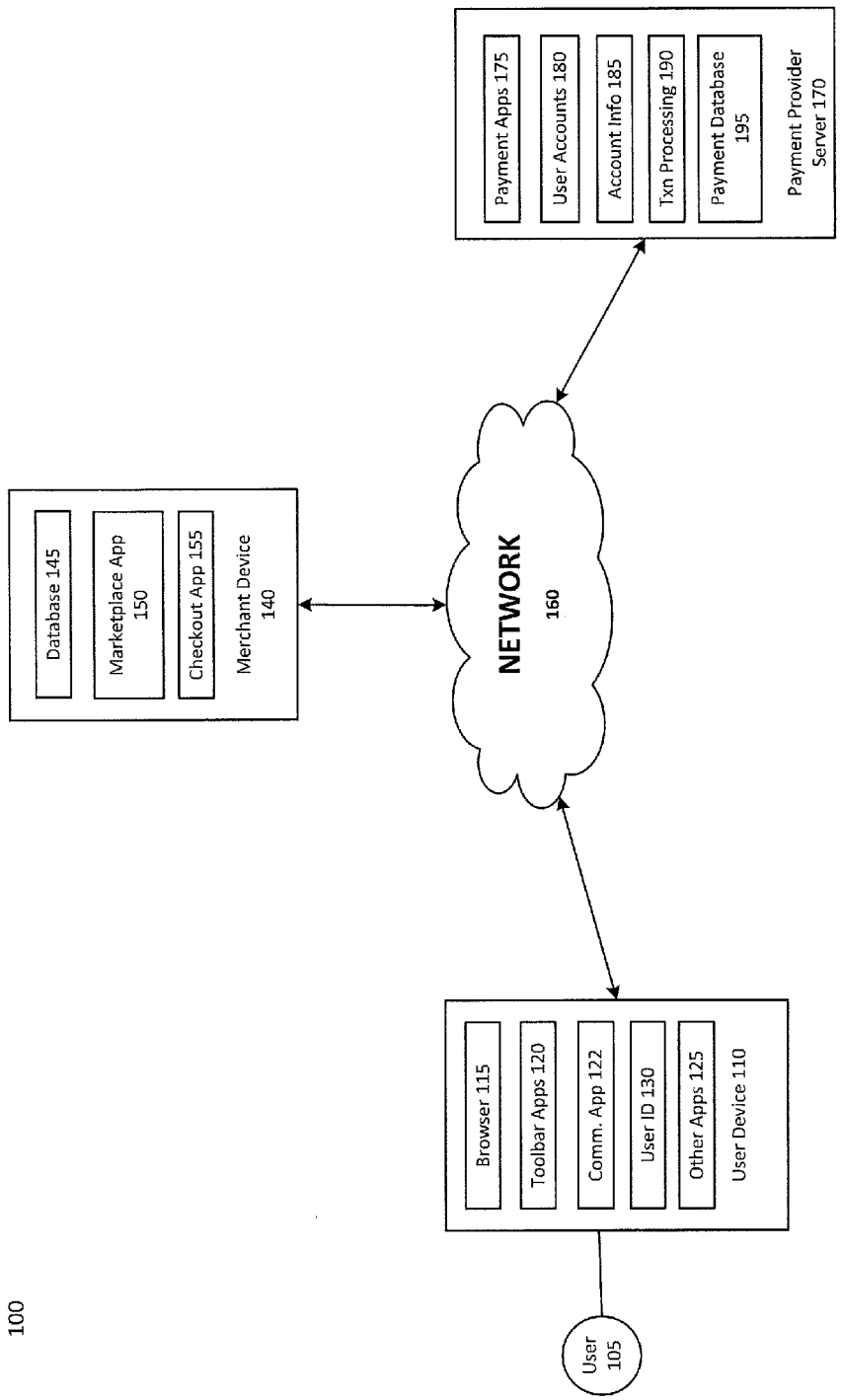
FIG. 1 is a block diagram of a networked system suitable for estimating wait time according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a system or method is provided to estimate wait time at a line or a queue. In particular, the system may estimate the wait time at a line by detecting the presence of a user in the line via Bluetooth Low Energy (BLE) communication. In an embodiment, the system may detect when the user enters the line at a particular location of the line (e.g., 50 feet from the end of the line) and when the user departs from or reaches an end of the line via BLE beacons and may estimate the wait time at the line based on how long the user is in line and/or a rate of progression through the line.

In an embodiment, a distance between the user and the BLE beacon may be estimated based on a strength of the BLE signal received at the user's device or at the BLE beacon installed at one or more different locations in the line. The system may use the estimated distance to determine a length of the line or a wait time for the user.

In an embodiment, a grid of multiple BLE beacons may be installed or provided at the location of the line to track the location and movement of a user. Based on the BLE signals detected at the user's mobile device, the location of the user in the line may be determined by triangulation and by referencing the designated positions of the BLE beacons that emit the BLE signals. As such, the system may determine how far the user is from the front of the line based on the location of the user. The system also may determine the speed the line is moving based on the movement of the user. Further, the system may determine the wait time for the line based on the location and the movement of the user. In another example, the locations and movements of two or more users may be used to estimate the wait time in the line.

In an embodiment, the system may estimate a length of the line by detecting the location of the newest arriving user via the grid of BLE beacons. For example, the presence and the location of the newest arriving user may be detected via the grid of BLE beacons. The location of the newest arriving user may then be used to determine the end of the line and to estimate the length of the line, assuming that the newest arriving user stands at the end of the line.

In an embodiment, the system may provide information regarding the wait time in the line to other users. For example, the wait time information may be posted on a website or may be pushed via notification to other users. In another embodiment, the system may provide estimated wait time to users who are currently waiting in line. In particular, the system may estimate or calculate the wait time for a particular user based on the particular user's location in line and may send a notification about the wait time to the particular user's device in real time.

In an embodiment, the system may detect a position of the user in line via Bluetooth beacons. The system may estimate the wait time for the user's position. For example, the system may retrieve historical data, such as wait time and/or line speed from previous days or previous hours, to estimate a current line speed. Thus, the system may estimate the wait time for the user's current position in line.

In an embodiment, the system may estimate and compare the wait times for multiple similar lines and may recommend a line with a shorter wait time to the user. For example, there may be three different security check lines at the airport for entering the same terminal. The system may estimate the wait times for these three security check lines and may recommend one with the shortest wait time to the user. In an embodiment, the system may recommend the security check line based on a user's flight time. For example, users who need to hurry to their boarding gates may be directed to a security check line with the shortest wait time while users who have spare time may be directed to a security check line with longer wait time.

FIG. 1 is a block diagram of a networked system 100 suitable for implementing a process for estimating wait time according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a merchant server 140, and a payment provider server 170 in communication over a network 160. Payment provider server 170 may be maintained by a payment service provider, such as PayPal, Inc. of San Jose, Calif. A user 105, such as a sender or consumer, utilizes user device 110 to perform a transaction using payment provider server 170. User 105 may utilize user device 110 to initiate a payment transaction, receive a transaction approval request, or reply to the request. Note that transaction, as used herein, refers to any suitable action performed using the user device, including payments, transfer of information, display of information, etc. For example, user 105 may utilize user device 110 to receive real-time estimated wait times in a line. Although only one merchant server is shown, a plurality of merchant servers may be utilized if the user is purchasing products or services from multiple merchants.

In some embodiments, user device 110 may download an application from payment provider server 170 or from merchant server 140. The application may allow user 105 to check the wait time of lines or queues at various merchants or public venues. User device 110 may include a Bluetooth device configured to implement low energy Bluetooth communication. A network of low energy Bluetooth beacons may be installed at various line locations at various merchants or public venues. Thus, the location and movements of user device 110 at the line locations may be detected by the various Bluetooth beacons. The location and movement of user 105 and/or other users may be used to estimate the wait time at various locations in the lines.

User device 110, merchant server 140, and payment provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, user device 110 may be implemented as a personal computer (PC), a smart phone, wearable device, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for setting up a shopping list and/or merchant sites for viewing and purchasing products and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, and texts through network 160, as well as applications that enable the user to communicate, transfer information, make payments, and otherwise communicate and receive information for estimating or estimated line wait times as discussed herein. User device 110 includes one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

User device 110 may include a Bluetooth device configured to implement low energy Bluetooth (BLE) communication. For example, user device 110 may detect various low energy Bluetooth signals from Bluetooth beacons installed in a merchant's store or at various public venues. Thus, locations and movements of user device 110 may be determined by positioning techniques, such as triangulation or location fingerprinting.

Merchant server 140 may be maintained, for example, by a merchant or seller offering various products and/or services or by an operator of a public venue. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as banks and retailers, or provides services and/or items to a user.

Merchant server 140 may include a database 145 identifying available products (including digital goods) and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment service provider server 170 over network 160. For example, checkout application 155 may receive and process a payment confirmation from payment service provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Merchant server 140 may be connected to a network of Bluetooth beacons installed in the merchant's brick-and-mortar store or at the operator's public venue. The network of Bluetooth beacons may be installed at or near the line locations of the merchant's store or public venue to form a grid. Each Bluetooth beacon may emit a low energy Bluetooth signal in a specific frequency spectrum periodically. Thus, the network of Bluetooth may allow detection of locations and movements of the consumer at different line locations.

Payment provider server 170 may be maintained, for example, by an online payment service provider which may provide services between user 105 and the operator of merchant server 140. In this regard, payment provider server 170 includes one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as banks or credit card companies. For example, account information 185 may include private financial information of users of devices such as account numbers, passwords, device identifiers, user names, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

In some embodiments, payment provider server 170 may maintain a database including information regarding the line locations at respective merchant stores or public venues. The information regarding the line locations may be include floor layout of the merchant store or public venue, location of the line, shape, size, and/or orientation of the line, service or facility access associated with the line, BLE beacons associated with the line, historical wait times of different lines in different venues at different times of the day or year, and the like. Payment provider server 170 may periodically update the information regarding the line location. In an embodiment, the payment provider server 170 may detect and analyze the location and movement of users waiting in a line to estimate the wait time of the line.

A transaction processing application 190, which may be part of payment application 175 or separate, may be configured to receive information from user device 110 and/or merchant server 140 for processing and storage in a payment database 195. Transaction processing application 190 may include one or more applications to process information from user 105 for processing an order and payment and/or determining rates of movement within a line as described herein. As such, transaction processing application 190 may store details of an order from individual users, including funding source used, credit options available, etc., as well as line positions, wait times, and lengths. Payment application 175 may be further configured to determine the existence of and to manage accounts for user 105, as well as create new accounts if necessary.

Figure 2:
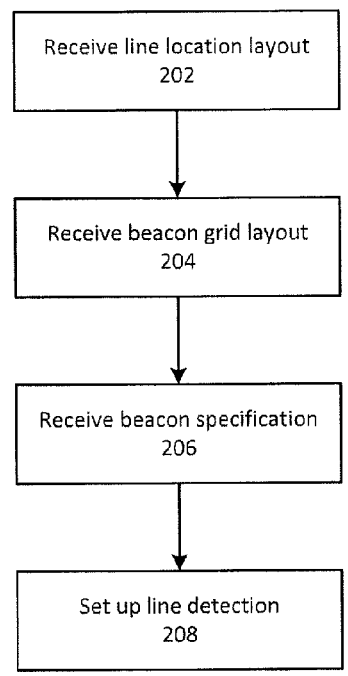
FIG. 2 is a flowchart showing a process for setting up wait time estimation according to one embodiment.

FIG. 2 is a flowchart showing a process 200 for setting up wait time estimation according to one embodiment. At step 202, user device 110 or payment provider server 170 may receive or access line location layouts of various merchants' stores and/or public venues. For example, floor layouts for grocery stores, retail stores, restaurants, museums, airports, amusements parks, or other public venues visited by consumers may be received by user device 110 or payment provider server 170. Each layout may include a profile indicating the name of the merchant or owner, the address, contact information, type of business, products or services offered, and other information related to the location. Payment provider server 170 may store the various store layouts in a database each with its own profile. The layouts may indicate line locations where lines may be formed by consumers or users to gain access to certain amenities or to receive service.

At step 204, user device 110 or payment provider server 170 may receive or access layouts of networks of beacons corresponding to the store layouts received in step 202. The beacon layouts may be merged with their corresponding store layouts, such that the coordinate of each beacon in the beacon grid may be designated. For example, a network of Bluetooth beacons may be installed in the merchant's store. Each Bluetooth beacon may be installed at a specific location in the merchant's store and may emit low energy Bluetooth signals. Thus, a network or grid of Bluetooth beacons may be formed in the merchant's store.

Figure 5:
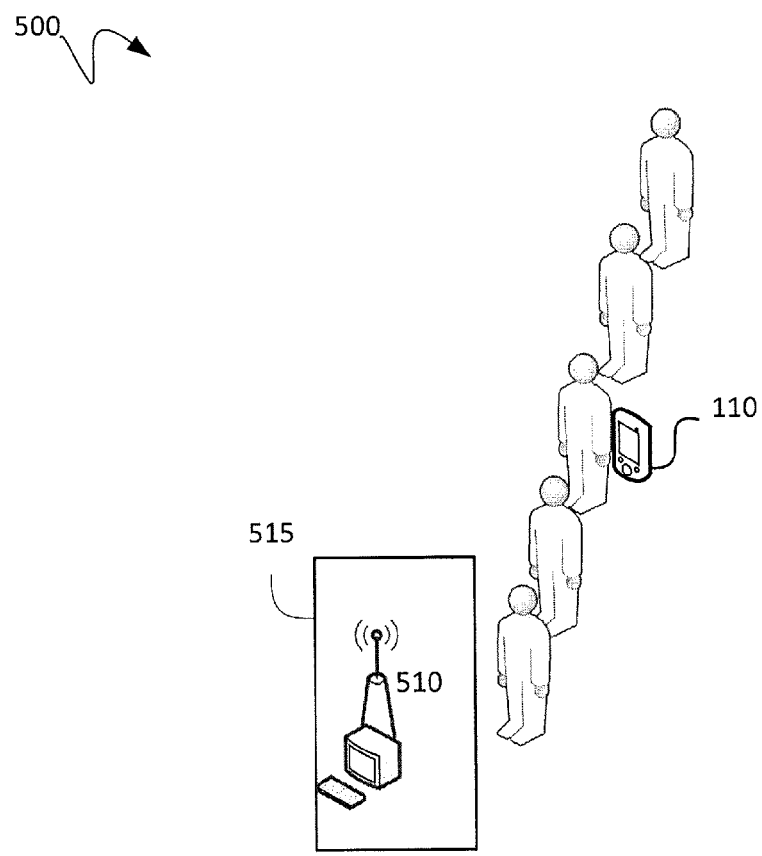
FIG. 5 is a diagram depicting customers waiting in line according to one embodiment.

As shown in FIG. 5, as an example, a Bluetooth beacon 510 may be installed at a checkout counter 515. The Bluetooth beacon 510 may be connected to merchant device 140. The Bluetooth beacon 510 may emit a low energy Bluetooth signal with specific frequency spectrum. User 105 may carry a user device 110 including a Bluetooth device configured to communicate via low energy Bluetooth communication. When user 105 enters the line location, user device 110 may detect Bluetooth beacons 510 installed at the checkout counter 515. Thus, the user 105 may be detected when the user 105 is standing in line via Bluetooth communication.

Returning back to FIG. 2, at step 206, user device 110 or payment provider server 170 may receive Bluetooth beacon specifications of various BLE beacons installed at respective line locations. Each Bluetooth beacon at the line location may emit a unique signal. A Bluetooth beacon database may be used to store profiles for each Bluetooth beacon. For example, each Bluetooth beacon may have a profile containing the Bluetooth beacon's line location, the unique signal signature of the beacon, the signal strength of the beacon, the broadcast range of the beacon, and the like. In some embodiments, a plurality of BLE beacons may be associated with a line location to provide better detection of the location and movement of users standing in line at the line location.

At step 208, the system may set up wait time detection at each line location based on the locations, the capabilities, and the number of BLE beacons installed at the line location. In particular, a wait time estimation scheme may be set up for each line location based on the availability and specification of BLE beacons installed at the line location. For example, one BLE beacon may be installed at or near the front of a line. Thus, the BLE beacon may detect the presence of users who are standing in line and who are in the broadcast range of the BLE beacon at the line location. The BLE beacon also may detect a relative distance of the users based on the strength of wireless signals received at the BLE beacon or at the respective user devices. As such, the system may determine the wait time at the line based on how long the respective users are present at the line location. The BLE beacon may broadcast in a certain direction or in all directions. For example, the BLE may broadcast toward an extending direction of the line. In another example, multiple BLE beacons may be installed at the line location to provide more accurate detection of the locations and/or movements of the users standing in line.

The wait time estimation scheme also may be set up for line location of various shapes, sizes, and lengths. For example, a checkout line at a grocery store may be a relative short straight line. In another example, a line for a ride at an amusement park may be a long line with a zig-zagging shape. The wait time estimation scheme may take these factors into account to provide better wait time estimation. In long lines, the GPS location of the users may be used in combination with BLE beacons to provide better wait time estimation.

The location of user device 110 may be determined based on the Bluetooth signals received at user device 110 using techniques, such as triangulation or location fingerprinting. In the triangulation technique, the location of user device 110 may be determined based on the locations of three Bluetooth beacons 510 and the distance of user device 110 from the three Bluetooth beacons 510. The locations of the Bluetooth beacons 510 may be predetermined when the Bluetooth beacons 510 are installed at the line location. The distance between the Bluetooth beacons 510 and user device 110 may be determined based on the signal strength received between the Bluetooth beacons 510 and user device 110. A stronger signal may indicate a shorter distance while a weaker signal may indicate a longer distance. Thus, based on the Bluetooth signals between the Bluetooth beacons 510 and user device 110, the location of user device 110 may be determined using the triangulation technique.

Figure 6:
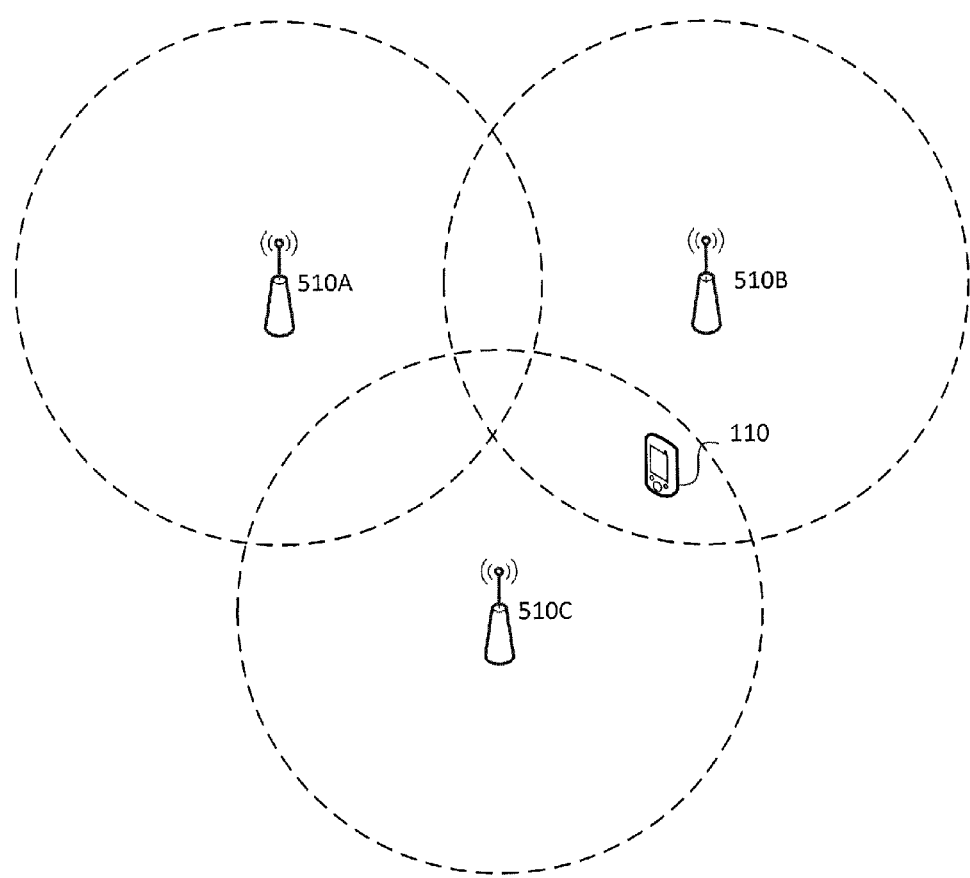
FIG. 6 is a diagram depicting a network of beacons according to one embodiment.

For example, as shown in FIG. 6, three Bluetooth beacons 510A, 510B, and 510C may each emit a unique Bluetooth signal. The signal range of each beacon may be illustrated as a circle of dashed line surrounding each beacon. As shown in FIG. 6, user device 110 may be located at a position at which user device 110 receives signals from beacon 510B and beacon 510C, but not beacon 510A. In particular, user device 110 receives signals with about the same signal strength from both beacons 510B and 510C. Thus, user device 110 is located between an area between beacons 510B and 510C, but away from 510A. Further, based on the signal strengths of the signals, the distance between user device 110 and beacons 510B and 510C may be determined. User device 110 or payment provider server 170 may analyze the signals and their signal strengths received at user device 110 and reference the locations of the beacons that emit these signals to determine the location of user device 110 by triangulation techniques.

In the location fingerprinting technique, a database of signal fingerprints at various locations within the public venue may be predetermined. For example, a signal profile may be predetermined for each location. The signal profile may include Bluetooth signals that are detected at that location and the strength of each of those detected Bluetooth signals. For example, as shown in FIG. 6, when user device 110 is positioned at a certain position between beacons 510B and 510C, a signal profile may be predetermined to indicate medium signals from beacons 510B and 510C and low or no signal from beacon 510A. A database of signal profiles associated with a plurality of respective locations on the shopping floor may be predetermined and stored. Thus, based on a signal profile detected by user device 110, a location of user device 110 may be determined by referencing the database of signal profiles.

In some embodiments, the signal profile may be the Bluetooth signal of user device 110 received by respective Bluetooth beacons. For example, as shown in FIG. 6, when user device 110 is positioned between beacons 510B and 510C, a signal profile may be predetermined to indicate medium signals received by beacons 510B and 510C, and weak or no signal received at beacon 510A. Thus, the signal fingerprints may be signals received by user device 110 or signals received by the respective Bluetooth beacons 510.

The location of user device 110 may be determined by user device 110. For example, user device 110 may download a layout map of the merchant or the public venue and may determine user device 110's position based on the Bluetooth signals detected and the floor layout of the Bluetooth beacons 510. In some embodiments, merchant device 140 may determine the location of user device 110 based on which Bluetooth beacons 510 detect user device 110 and the strength of the signal detected at the Bluetooth beacons 510. In some embodiments, the detected signals and signal strengths may be forwarded to payment provider server 170 and payment provider server 170 may determine the location of user device.

Accordingly, process 200 may be used to set up wait time estimation for lines at various merchant stores or public venues. For example, the line location, floor layout, number, specification, and locations of BLE beacons installed at the line location, and other related information may be collected and used to estimate wait time at the line location. Thus, based on the BLE communication set up at the line location, the system may detect the presence, location, and/or movement of users standing in line and may estimate the wait time at the line location in real time.

Figure 3:
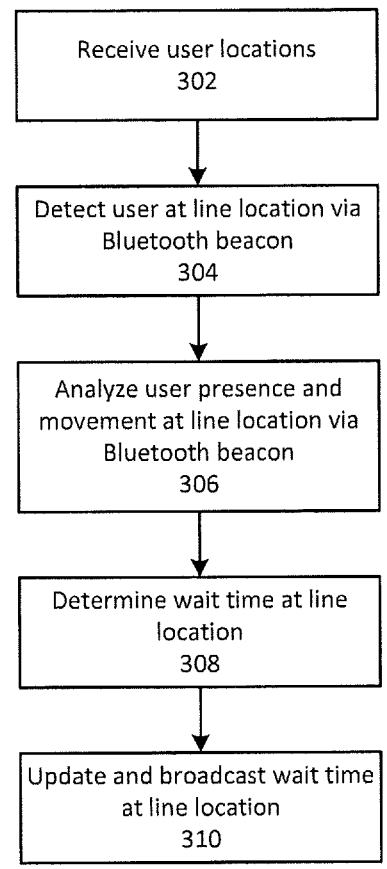
FIG. 3 is a flowchart showing a process for wait time estimation according to one embodiment.

FIG. 3 is a flowchart showing a process 300 for estimating wait time at a line location according to one embodiment. At step 302, merchant device 140 or payment provider server 170 may receive user 105's location. For example, as noted above, the location and/or movement of the user 105 may be detected by one or more BLE beacons installed at a store or public venue. In another embodiment, the location of the user 105 may be detected by GPS device included with user device 110.

At step 304, the presence of a user 105 at a line location may be detected by one or more BLE beacons. One or more BLE beacons may be installed at a line location of a store or a public venue. The presence of the user 105 may be detected by the BLE beacons when the user device 110 receives and responds to the BLE beacons' Bluetooth signals. For example, a grid of BLE beacons may be positioned along different positions of an anticipated line, such as from the front of a checkout terminal to the farthest distance the merchant expects a line to extend, in whatever shape the line is expected to take. The BLE beacon may broadcast a Bluetooth signal in an extending direction of the line. When the user 105 enters at the end of the line, the Bluetooth signal from the BLE beacon may be received by use device 110 which may respond with a Bluetooth signal back to the BLE beacon. Thus, the system may detect that the user 105 has entered the line location at a particular location of the merchant store.

In an embodiment, a plurality of BLE beacons may be installed at the line location to provide more accurate detection of the location and movement of the users at or near the line location. The plurality of BLE beacons may allow the system to detect the user 105's location and movement within the line location. For example, the BLE beacons may detect the presence of the user 105 and where the user 105 enters the line, the movement and speed of the user 105 in line, when and/or where the user 105 reaches the front of the line, and when and/or where the user 105 departs from the line location. The BLE beacons may also detect rates of movement within various locations in the line.

In an embodiment, the system may distinguish users who are passing by the line location from users who are standing in line. In particular, the BLE beacon may detect the presence of users who are passing by the line location but are not standing in line at the line location based on movement of users. For example, a user moving quickly along a path of a line may be determined to be just passing by, as opposed to a user stopping and starting at different intervals within the line. The system may determine that users who remain in the line location for a predetermined period of time as user who are standing in line. In another embodiment, the system may detect the user 105's location and movement using a plurality of BLE beacons to determine whether the user 105 is standing in line and whether the user 105 is moving along with the line. In still another embodiment, the system may ask the user to confirm whether he/she is standing in line. For example, when the user 105 departs from the line location before the user 105 reaches the front of the line, the system may ask the user 105 whether he/she is giving up on waiting. This may also be determined automatically, such as the system detecting users still in front of the user 105 when the user moves away from the line. Users near the end of a long line may more likely leave the line due to a long perceived weight, while those near the front of the line are less likely to leave since they have already spent time waiting and are close to the front. This data can be used to update wait times and line progression.

At step 306, the system may analyze the user's presence, location, and/or movement detected at the line location. For example, the system may analyze when the user 105 enters the line location and when the user departs from the line location. The system may analyze the location where the newest arriving user enters the line and the shape, direction, size, of the line location to determine the length of the line. The system may analyze the presence, locations, and/or movements of multiple users who are standing in line. The system may analyze the speed of the respective users moving through the line.

At step 308, the system may determine the wait time at the line based on the collected location and/or movement of users standing in line. In an embodiment, the system may determine when the user 105 arrives at the line location and when the user 105 departs from the line location. The system may determine the difference in the arrival time and the departure time to estimate the wait time at the line as well as a rate of progression of the line using the length of the line as an additional data point. In some embodiments, the system may use the arrival and departure times of a plurality of users to determine the different wait times of the respective users. The system may take an average of their wait times to estimate a general wait time of the line. In an embodiment, the system may take the average of the wait times of the most recent users who waited in the line, such as the average wait time of the last ten users who waited in the line.

In an embodiment, the system may estimate the length of the line and the speed the line is moving to determine the wait time of the line. Because the length of the line and the speed of the line may change over time, this method may provide a more accurate or more updated estimate of the wait time. For example, the system may detect the location where the newest user arrives at the line to determine the end of the line. Based on the shape and the extending directions of the line, the system may estimate the length of the line based on where the line ends. Because not all users carry a BLE enabled device, this estimation may be implemented when the system detects that a new user with a BLE enabled device arrives at the line location.

The system also may determine the speed of the line based on the moving speed of one or more users who are standing in line. The speed of the line may be different for different sections of the line. Due to the length of the line, the movement of users may propagate slowly from the front of the line to the end of the line with some lag. As such, the speed of the line detected near the front of the line may be given more weight than the speed of the line detected near the end of the line. The wait time may then be determined based on the length of the line and the speed of the line. For example, the wait time may be calculated by dividing the length of the line by the speed of the line. Because the length of the line and the speed of line may change frequently, this method may allow the system to have a more updated length of line based on the location of the newest arriving user and the speed of the line detected in real time.

In an embodiment, the system may determine the general wait time of the line for users who will be arriving at the end of the line. The general wait time may be broadcasted or published to other users at step 310. For example, a display may be installed at the end of the line to inform newly arriving users of the expected wait time of the lien. In another example, the general wait time may be published on a website such that other users may check the general wait time of the line via the internet.

In an embodiment, the system may determine the wait time for a user who is standing in line based on the user's location in line. For example, the user device 110 may send the location of the user 105 in the line to the system. In response, the system may determine a wait time for the user 105 based on the user 105's current location in line and may send the wait time to the user device 110. Thus, the user 105 may be standing in line and may receive continuous updates of the wait time as the user 105 is moving through the line.

In an embodiment, the system may determine a wait time for the user 105 based on the user 105's current location and the estimated speed of the line. For example, the current location of user 105 in line may be detected via Bluetooth beacons installed at the line location. The speed of line may be estimated based on the movement of the user 105 and/or the movement of other users currently in line. In another embodiment, the system may retrieve historical data of the speed of line from the previous days or previous hours. Based on the historical data, a pattern of line speed at different hours, days, or months, may be determined. Thus, the speed of line may be estimated based on the current time, day, or month in view of the historical data. The system may then estimate the wait time for the user 105's location in line based on the estimated speed of line and the detected location of the user 105 in line.

In an embodiment, the system may estimate the wait times in multiple lines that provide similar access or service to the user 105. The system may recommend one of the multiple lines to the user 105 based on their wait times. For example, the system may recommend a line that has the shortest wait time for the user. In an embodiment, the system also may recommend a line to the user 105 based on the user's schedule. For example, the user 105 may have a flight time, an appointment, or other scheduled event on the user's schedule or calendar. The system may select a wait line for the user based on the user 105's scheduled event. For example, the user 105 may have a scheduled flight and may need to get through a security check line at an airport to get to the boarding gate. In this case, the system may select a security check line based on the wait time at the line and the boarding time of the flight. If the user 105 needs to hurry to get to the boarding gate, the system may select the security line with the shortest waiting time. If the user 105 has spare time to get to the boarding gate, the system may select the security line with longer wait time, such that the security line with shorter waiting time may be available to other users who are in a hurry. This information may be conveyed to merchant devices at the front of the line or an authorization may be displayed on the user device so that only those users with pressing time constraints are allowed to use the shorter or faster moving lines.

By using the above process 300, the wait time of a line may be estimated based on presence, locations, and movement of users detected via Bluetooth communication. In particular, the wait time of a line may be estimated based on how long users are in line, the length of the line, the moving speed of the line, or the like.

The above processes 200 and 300 may be executed by user device 110. In some embodiments, the processes 200 and 300 may be executed at merchant device 140 or payment provider server 170. In some other embodiments, above processes 200 and 300 may be executed by one or more of user device 110, merchant device 140, and payment provider server 170 in coordination with each other.

Figure 4:
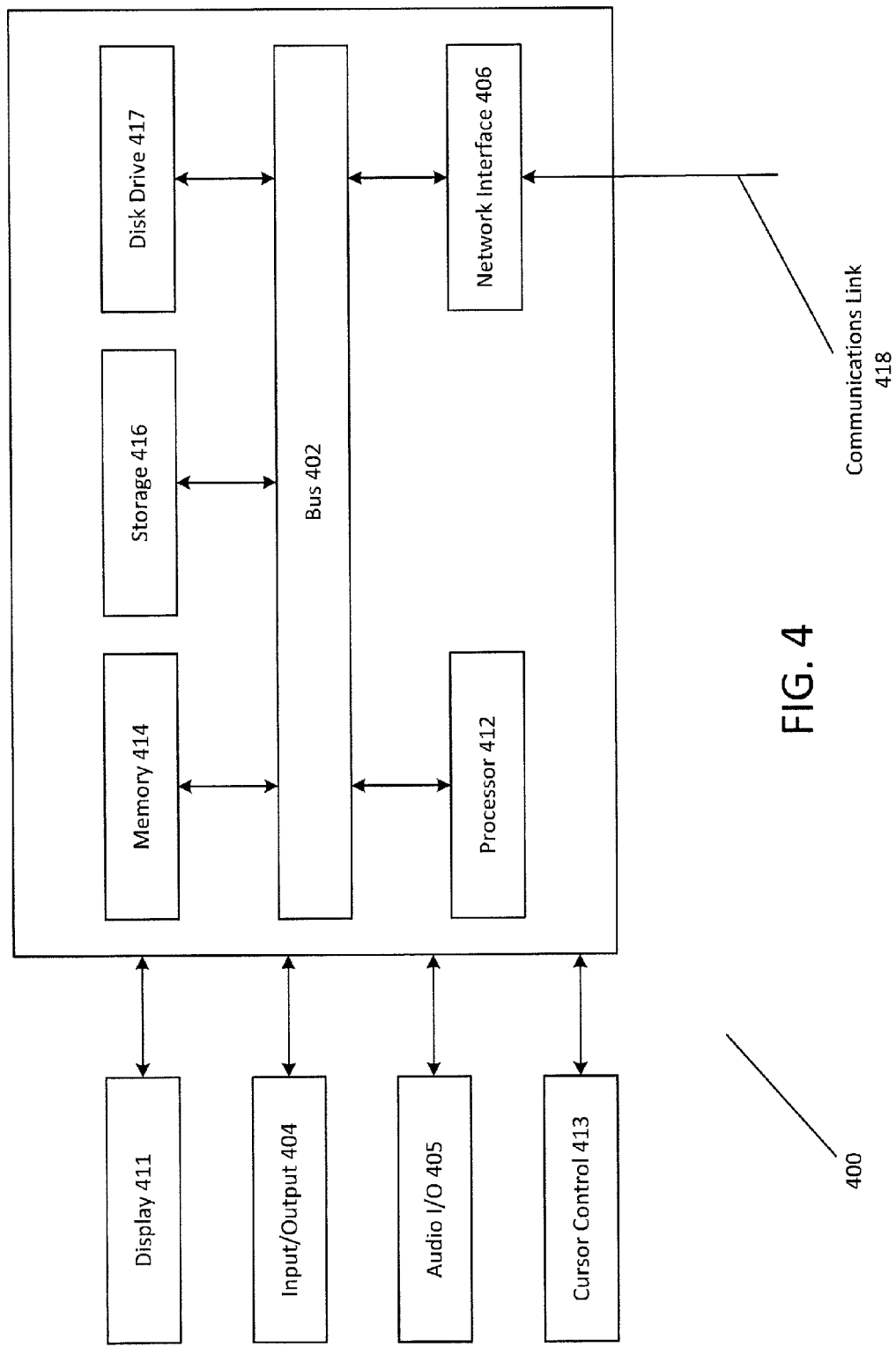
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 160. In one embodiment, the transmission is wireless, although other transmission mediums and methods may also be suitable. A processor 412, which can be a microcontroller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
      detecting a user device of a user at a line location by one or more Bluetooth beacons via Bluetooth communication;
      determining a position of the user in a line at the line location;
      determining a wait time at the line location based on the position of the user in the line;
      based on a schedule of the user, determining an alternate line with a shorter wait time than the wait time of the line; and
      communicating a suggestion to the user at the user device to move to the alternate line including an authorization required for accessing the alternate line displayed on the user device.

2. The system of claim 1, wherein the wait time at the line location is determined based on a time duration of a presence of another user at the line location.

3. The system of claim 2, wherein the time duration of the presence of the another user is determined from an arrival time of the another user at the line location to a departure time of the another user from the line location.

4. The system of claim 1, wherein the operations further comprise:
   detecting a plurality of users at the line location; and
   determining the wait time at the line location based on an average time duration of the plurality of users at the line location.

5. The system of claim 1, wherein the operations further comprise:
   detecting a location and a movement of another user at the line location using the one or more Bluetooth beacons installed along the line; and
   determining the wait time at the line location based on the location and movement of the another user at the line location.

6. The system of claim 5, wherein the location and movement of the another user is determined by triangulation technique or by location fingerprint technique.

7. The system of claim 5, wherein the operations further comprise:
   determining a length of a line at the line location based on an arriving location of the another user at the line location and a shape and an extending direction of the line;
   determining a moving speed of the line based on the movement of the another user at the line location; and
   determining the wait time at the line location based on the length of the line and the moving speed of the line.

8. The system of claim 1, wherein the operations further comprise:
   retrieving historical data of speeds of the line; and
   determining a wait time for the user based on the historical data and the location of the user in the line.

9. The system of claim 8, wherein the operations further comprise:
   communicating the wait time for the user to the user device; and
   updating the wait time for the user at the user device as the user moves along with the line.

10. The system of claim 1, wherein the operations further comprise communicating the wait time of the line location to other users.

11. A method comprising:
    detecting, by one or more Bluetooth beacons, a user device of a user at a line location via Bluetooth communication;
    determining, by a hardware processor, a position of the user in a line at the line location;
    determining, by the hardware processor, a wait time at the line location based on the position of the user in the line;
    based on a schedule of the user, determining, by the hardware processor, an alternate line with a shorter wait time than the wait time of the line; and
    communicating, by the hardware processor, a suggestion to the user at the user device to move to the alternate line including an authorization required for accessing the alternate line displayed on the user device.

12. The method of claim 11, wherein the wait time at the line location is determined based on a time duration of a presence of another user detected at the line location.

13. The method of claim 11 further comprising:
    detecting a location and a movement of another user at the line location using the one or more Bluetooth beacons installed along the line at the line location; and
    determining the wait time at the line location based on the location and movement of the another user at the line location.

14. The method of claim 13, further comprising:
    detecting respective locations and movements of other users at the line location using the one or more Bluetooth beacons installed along the line at the line location; and
    determining the wait time at the line location based on the locations and movements of the other users at the line location.

15. The method of claim 14, further comprising:
    determining a length of a line at the line location based on an arriving location of a newest arriving user at the line location and a shape and an extending direction of the line;
    determine a moving speed of the line based on the movements of the other users at the line location; and
    determine the wait time at the line location based on the length of the line and the moving speed of the line.

16. The method of claim 15, wherein a movement of a user located closer to a front end of the line is given more weight than a movement of a user located closer to a rear end of the line for determining the moving speed of the line.

17. The method of claim 11, further comprising:
    determining wait times for a plurality of line locations; and
    recommending one of the plurality of line locations to the user based on the respective wait times of the plurality of line locations.

18. The method of claim 17, wherein the recommended one of the plurality of line locations is selected based on the schedule of the user.

19. A non-transitory machine-readable medium having stored thereon machine-readable instructions executable to cause a machine to perform operations comprising:
- detecting a user device of a user at a line location by one or more Bluetooth beacons via Bluetooth communication;
- determining a position of the user in a line at the line location;
- determining a wait time at the line location based on the position of the user in the line;
- based on a schedule of the user, determining an alternate line with a shorter wait time than the wait time of the line; and
- communicating a suggestion to the user at the user device to use the alternate line including an authorization required for accessing the alternate line displayed on the user device.

20. The non-transitory machine-readable medium of claim 19, wherein the operations further comprise communicating the wait time to other users via Bluetooth communication or a display installed at the line location.

* * * * *